United States Patent [19]

Maeno

[11] Patent Number: 4,980,712
[45] Date of Patent: Dec. 25, 1990

[54] FILM TAKE-UP SPOOL FOR CAMERA

[75] Inventor: Hiroshi Maeno, Tokyo, Japan

[73] Assignee: Canon Kabushiki Kaisha, Tokyo, Japan

[21] Appl. No.: 500,118

[22] Filed: Mar. 27, 1990

Related U.S. Application Data

[63] Continuation of Ser. No. 246,275, Sep. 19, 1988, abandoned.

[30] Foreign Application Priority Data

Sep. 24, 1987 [JP] Japan .......................... 62-145890[U]
Oct. 2, 1987 [JP] Japan .......................... 62-151508[U]

[51] Int. Cl.⁵ ............................................. G03B 1/04
[52] U.S. Cl. .................................................. 354/212

[58] Field of Search .............. 354/212; 242/71.4, 71.5, 242/71.8

[56] References Cited

U.S. PATENT DOCUMENTS 4,274,726 6/1981 Yoneyama et al. ............. 354/212 X
4,600,286 7/1986 Harvey ................................ 354/212
4,699,489 10/1987 Nii ........................................ 354/212

Primary Examiner—Michael L. Gellner
Attorney, Agent, or Firm—Fitzpatrick, Cella, Harper & Scinto

[57] ABSTRACT

A film take-up spool for a camera has a flange for film guide, wherein the flange is provided with guide means of a shape that upon riding of the film on the flange it directs the riding film away from the riding state as the spool rotates.

88 Claims, 10 Drawing Sheets

FILM TAKE-UP SPOOL FOR CAMERA

This application is a continuation of application Ser. No. 246,275 filed Sept. 19, 1988, now abandoned.

BACKGROUND OF THE INVENTION

1. Field of the Invention:

This invention relates to a film take-up spool for camera and, more particularly, to the shape of a flanged portion on the end of the drum of the spool.

3. Description of the Related Art:

The conventional film take-up spools for cameras have generally been known of the type in which the spool is provided with a claw for engagement with the perforations of the film to take up the film as the spool rotates.

Figure 10:
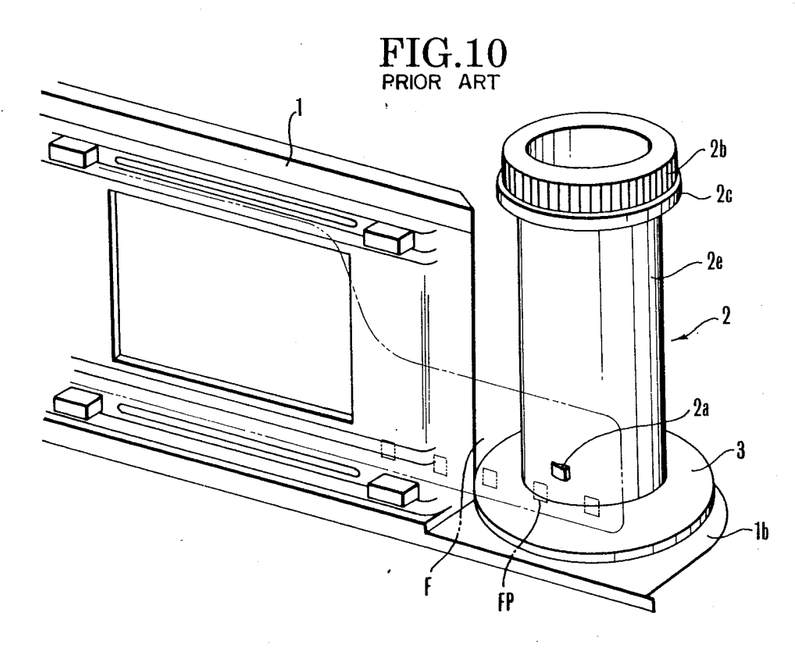
FIG. 10 is a perspective view illustrating the conventional spool in the assembled state in the camera.
Figure 11:
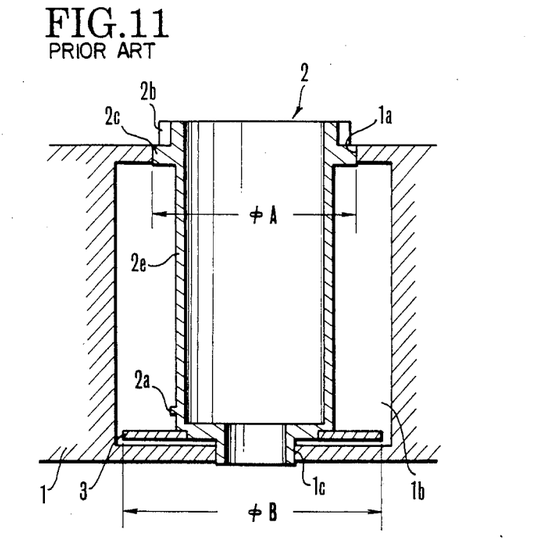
FIG. 11 is a sectional view of the spool of FIG. 10.

FIG. 10 and FIG. 11 show an example of this conventional type of film take-up spool. A camera body 1 supports a film take-up spool 2 having a claw 2a in the vicinity of the lower end of a drum portion 2e thereof, around which the film F is wound with the perforation Fp in engagement with the claw 2a. A geared portion 2b in the upper end of the drum portion 2e is drivingly connected to an electric motor (not shown). Further, a flanged portion 2c for a film guide is formed beneath the geared portion 2b. Reference numeral 3 identifies is a flange for a film guide provided on the lower end of the drum portion 2e so as to confront the aforesaid flanged portion 2c in spaced relation, its diameter being slightly smaller than the inner diameter of a spool chamber 1b in the camera body 1. As shown in FIG. 11, the flange 3 which is near to the claw 2a is formed separately from the drum portion 2e. The reason why the flange 3 and the drum portion 2e are separately formed from each other is that if the flange 3 of the claw side is formed integrally with the drum portion 2e under the condition that, in FIG. 11, the outer diameter $\phi_B$ of the flange 3 is larger than the outer diameter $\phi_A$ of the flanged portion 2c, the flange 3 of the claw side could not pass through the spool insertion hole 1a formed in the camera body 1, because the spool insertion hole 1a is formed to the same size as the outer diameter $\phi_A$ of the flanged portion 2c. Thus, it would become impossible to assemble them. As its countermeasure, the inner diameter of the spool insertion hole 1a may be made equal to the outer diameter $\phi_B$ of the flange 3. But by the increase of the diameter of the spool insertion hole 1a, the rigidity of the camera body 1 would be very weakened, and the danger that light will leak through formed the gap between this spool insertion hole 1a and the flanged portion 2c. Accordingly, the possibility of the exposed film being fogged would very increase. For these reasons, it has been the common practice that the drum portion 2e and the flange 3 are separately formed from each other.

Nonetheless, the use of the separate form of the drum portion 2e, and the flange 3 from each other in view of cost adds to cost of two parts. Also when assembling, the drum portion 2e is inserted past the spool insertion hole 1a, then the flange 3 of the claw side is put into the spool chamber 1b and then, while the drum 2e and the flange 3 of the claw 2a side are being brought into fitting engagement with each other in the interior of the camera housing, the drum portion 2e is fitted in a hole 1c of the lower side of the camera body 1. Such operations are very troublesome. Also, since the flanged portion 2c and the flange 3 of the claw 2a side are separate parts, the size control between both ends or the flanged portion 2c and the flange 3 is so difficult that there is a high possibility of not achieving the fundamental aim that the film is steadily held between these ends to prevent displacement of the film F to the thrust direction, or the so-called "bamboo shoots winding" phenomenon from occurring.

To restrain the film F from movement to the thrust direction by the flanged portion 2c and the flange 3, the first three or four turns of winding of the film must be controlled properly. And the subsequent turns will be wound up in the place. Conversely, if it happens that the first three or four turns are out of alignment in the thrust direction, the winding shift of the subsequent turns will grow, thus intensifying the above-mentioned "bamboo shoots winding" phenomenon.

Figure 12:
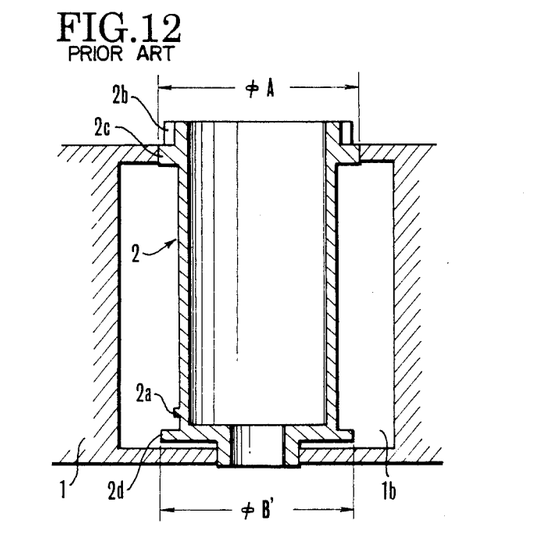
FIG. 12 is a sectional view of another conventional spool.

Meanwhile, to eliminate the above-described problems of cost, assembling operations and size control, another spool has been proposed that, as shown in FIG. 12, a flanged portion 2d is formed at the claw 2a side also integrally with the drum portion 2e and its outer diameter $\phi_B'$ is made equal to, or slightly smaller than, the outer diameter $\phi_A$ of the opposite flanged portion 2c to the claw 2a.

In other words, the use of the integral form of both flanged portions 2c and 2d with the drum portion 2e at the ends thereof makes it possible to reduce the cost. The assembling operation is only to put the spool 2 into the spool chamber from the above. Further, because all the portions of the spool 2 constitute only one part, control of the dimensions between both flanged portions becomes easy. As the shape of the tip of the film F varies, however, by using such a spool 2, an alternative problem arises.

Figure 13A:
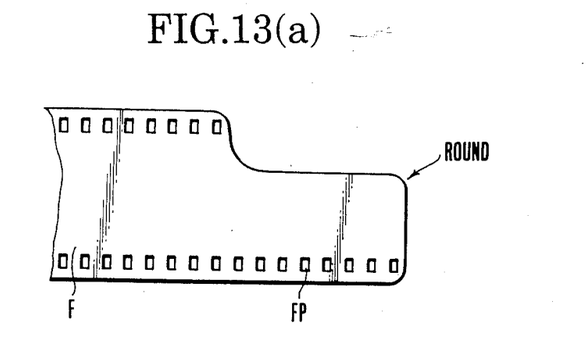
FIGS. 13(a) and 13(b) are plan views of the tips of leader of film.
Figure 13B:
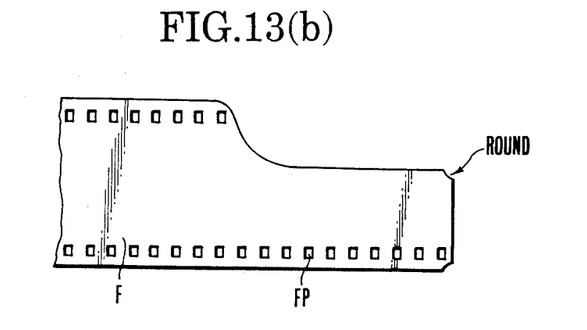
Figure 14:
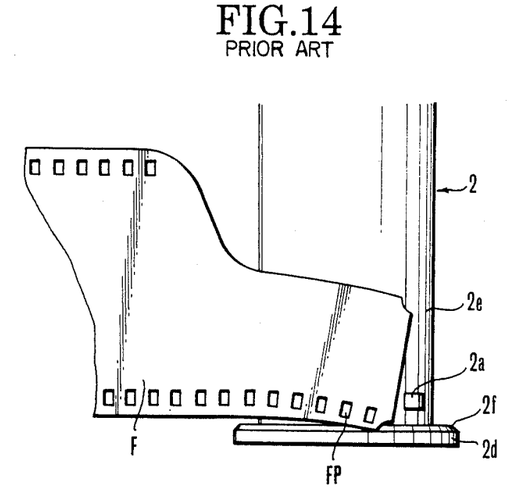
FIG. 14 is an elevational view of the tip of film leader riding on the flange of the spool.

That is, as shown in FIGS. 13(a) and 13(b), the tip of leader of the film F is, as typical examples, either outwardly rounded at the corners (hereinafter called "F type" (FIG. 13(a))), or inwardly rounded at the corners (hereinafter called "K type" (FIG. 13(b))). In the case when the film of K type is loaded to the spool 2, as shown in FIG. 12, because the outer diameter of the flanged portion 2d of the claw 2a side is small, it often happens that the tip of the leader of the film F rides on the outer periphery of this flanged portion 2d, as shown in FIG. 14. Even if the inside corner of the outer peripheral portion of this flanged portion 2d is tapered off to form a chamfer 2f, making it easier for the film F to slip down to the drum 2e side, the inward curvature of the cutout of the outside corner of the tip of the leader of the K type film causes this cutout portion to bite and ride on the outer peripheral portion of the flanged portion 2d. As a result, the perforation Fp of the film F is hindered from engaging with the claw 2a. Therefore, in the camera employing the auto-loading type windup mechanism, because, after the back cover (not shown) of the camera body 1 has been closed, the perforation Fp of film is engaged with the claw 2a and the film is wound up to a plurality of frames, a problem arises that winding up of the film becomes impossible.

Incidentally, in the case of using the F type film, even if the film rides on the flanged portion 2d, such a problem scarcely occurs because the convex curvature of the corners of the tip of the leader brings the tip down along the chamfer 2f to the drum portion 2e automatically or by the pressure of an auto-loading mechanism (not shown).

SUMMARY OF THE INVENTION

With the foregoing situations in mind, the present invention has been made and provides a film take-up spool for a camera having a flange for a film guide, wherein the aforesaid flange is provided with guide means operating in such a manner that when the film rides on that flange, the riding film is taken away from the riding state, whereby the assembling of the spool into the camera body is simple, and the film can surely be wound around the spool.

Other objects of the invention will become apparent from the following description of embodiments thereof.

DETAILED DESCRIPTION OF THE PREFERRED EMBODIMENTS

The invention is next described in detail in connection with embodiments thereof by reference to the drawings.

Figure 1:
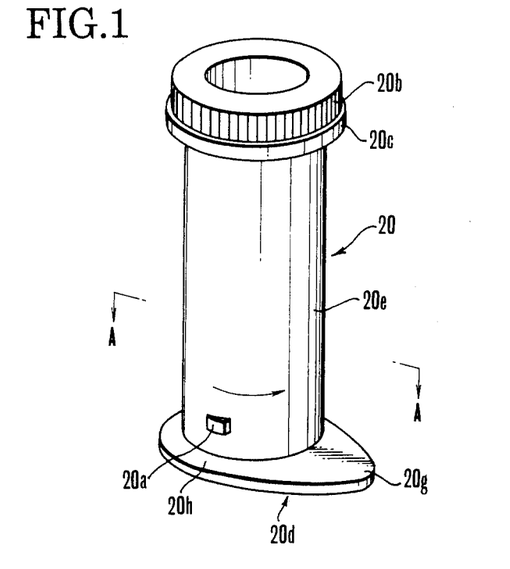
FIG. 1 is a perspective view of one embodiment of a film take-up spool provided in the camera according to the invention.
Figure 2:
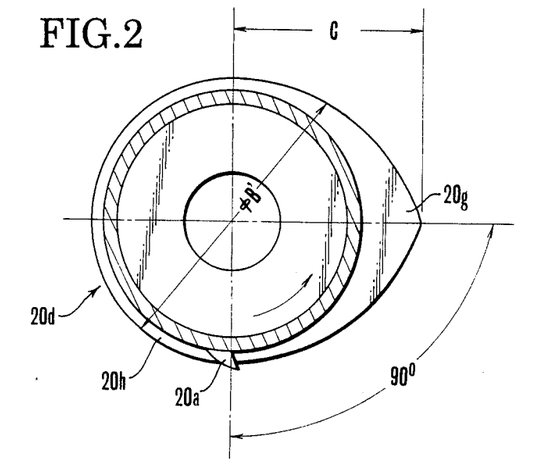
FIG. 2 is a cross-sectional view taken along line A—A of FIG.

FIG. 1 is a perspective view of an embodiment of the film take-up spool provided in the camera according to the invention, and FIG. 2 is its cross-sectional view.

The film take-up spool 20 according to this embodiment has a drum portion 20e around which film is to be wound and with which a claw 20a for engagement with the perforation of the film and flanges 20c and 20d for a film guide are formed integrally. A geared portion 20b in mesh with a drive mechanism, including an electric motor and other components (not shown), is fixedly mounted on the top of the drum portion 20e. And, the lower flange 20d, which is nearer to the claw 20a, is formed to a flat oval shape such that the circular portion 20h of outer diameter $\phi_B'$ extending radially outwardly of the outer periphery of the drum portion 20e is expanded in one semi-circle radially outward to a projected portion 20g with its vertex at a distance C as measured from the axis of the drum portion 20e. It should be noted that, as shown in FIG. 2, the outer diameter $\phi_B'$ of the lower flange 20d, similarly to the before-described conventional example, is equal to, or slightly smaller than, the inner diameter of the spool insertion hole 1a of the camera body 1, and that the length C of the projected portion 20g is formed to a smaller radius than the radius D of the spool chamber 1b of the camera body 1.

Hence the spool 20 can be assembled with the camera body 1 easily and quickly thanks to the use of such a flat oval shape of the lower flange 20d of the spool 20. Moreover, regardless of the shape of the corners of the tip of the film leader, it is made possible to reliably engagement between the perforation of the film and the claw 20a.

Figure 3:
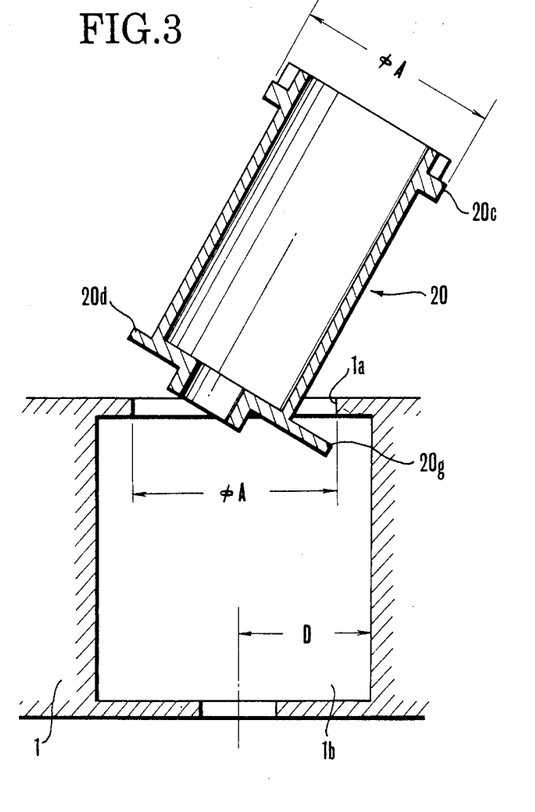
FIG. 3 is a sectional view illustrating its assembling method.

In more detail, to assemble the spool 20 with the camera body 1, the spool 20 is inclined as shown in FIG. 3. Thus, the lower flange 20d can pass through the spool insertion hole 1a of the camera body 1.

Also, in the case that automatic loading is carried out by putting the leader of film on the drum portion 20e, for the film whose tip is of the K type shown in FIG. 13(b), even if it happens that one of the corners of the tip of the film leader rides on the circular portion 20h as the spool 20 rotates in the film windup direction, the film leader is later swung largely to distort by the projected portion 20g. Thus, without having to hold the cutout of the lower corner of the tip of the film leader in engagement on the outer periphery of the lower flange 20d for a long time, the tip of the film leader drops to the drum portion 20e by the elastic retrieving force of the film itself. Hence, the film positions itself at a position where the perforation Fp can engage the claw 20a. Upon engagement of the claw 20a with the perforation Fp, winding up of the film takes place.

It should be noted that the spatial relation between the claw 20a and the projected portion 20g of the lower flange 20d is exemplified in FIG. 2 where the projected portion 20g is located at an angular distance of about 90° ahead the claw 20a in the direction in which the spool 20 advances when winding up, with an advantage of good timing such that soon after the tip of the film leader has dropped on the drum portion 20e, the claw 20a snatches up the perforation of the film. Yet, this depends on the diameter and the speed of rotation of the spool 20. Once the tip of the film leader has dropped on the drum portion 20e, it never rides up again on the outer periphery of the lower flange 20d. Hence, there is no impediment to whatever a relative position to the claw 20a the projected portion 20g of the lower flange 20d may take.

Figure 4:
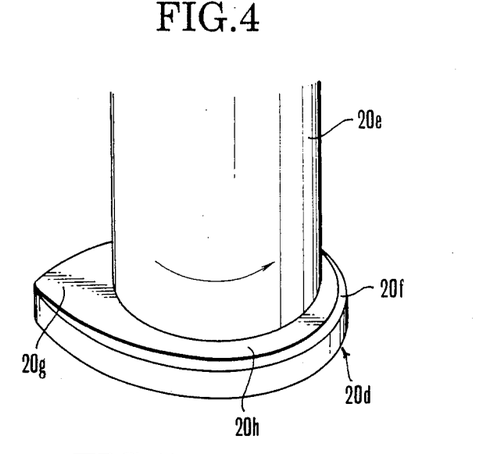
FIG. 4 and FIG. 5 are perspective views of the lower flanges of other embodiments of the invention.

Further, by applying a chamfer 20f to the outer peripheral surface as shown in FIG. 4 and forming this chamfer 20f so as to become gradually smaller toward the tip of the projected portion 20g, in the case when the film of K type is used, even if the cutout of the corner of the tip of the film leader engages the outer periphery of this lower flange 20d, the tip of the film leader can be dropped to the drum portion 20e easily, because the tip of the film leader is drawn near the drum portion 20e as it moves from the circular portion 20h of the lower flange 20d to the projected portion 20g by rotation of the spool 20.

Figure 5:
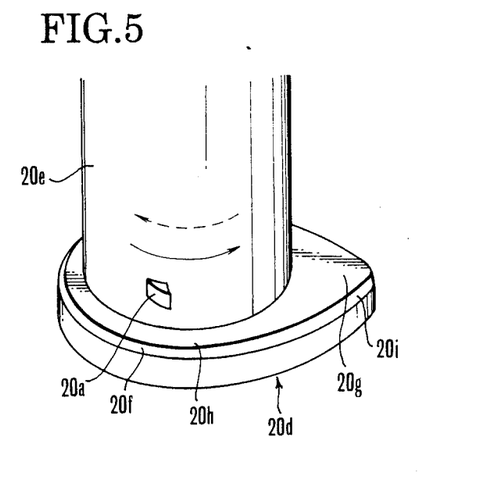

Also, as there is a camera in which not only when winding up, but also when rewinding the film, the spool is rotated to the reverse direction to send out the film, in this case, if the film wound around the drum portion 20e of the spool 20 is slackened becoming a so-called "loose winding", the rotation of the spool 20 and the rotation of the film differ from each other and, in some case, the film is rubbed by the projected portion 20g of the aforesaid flange 20d of the spool 20. Therefore, as shown in FIG. 5, the outer peripheral portion of the projected portion 20g of the lower flange 20d, particularly the area 20i of the advance direction as viewed from the rewind direction (indicated by a dash line arrow in the figure,) has to be chamfered, or its ridge has to be rounded, thereby making it possible to reduce the resistance when rewinding the film.

Figure 6:
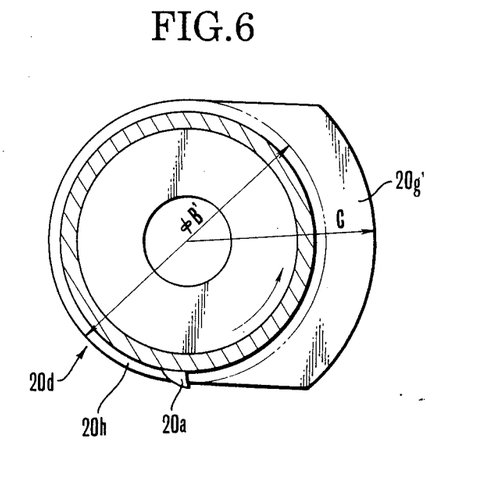
FIG. 6 is similar to FIG. 2 except that another embodiment of the film take-up spool provided in the camera according to the invention is illustrated.

It should be noted that the projected portion 20g is not necessarily of the oval shape, but may be in such a form as shown in FIG. 6. In this case, the projected portion 20g' of radius C is large. In principle, therefore, the probability of riding of the tip of the film leader on the small diameter flange 2d as shown in FIG. 14 can be lowered itself.

Figure 7:
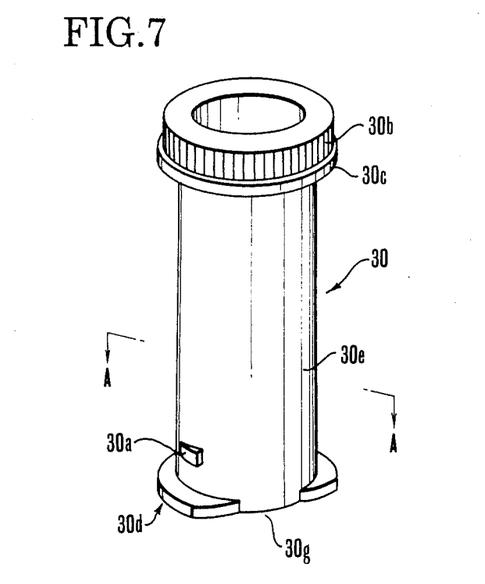
FIG. 7 is a perspective view of still another embodiment of the film take-up spool provided in the camera according to invention.
Figure 8:
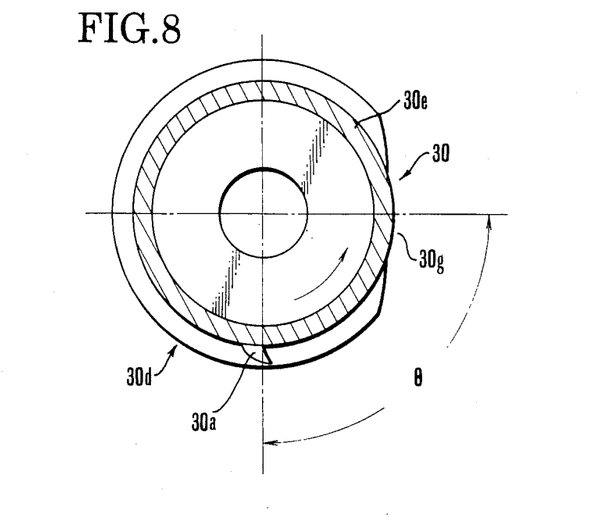
FIG. 8 is a cross-sectional view taken along line A—A of FIG. 7.

FIG. 7 is a perspective view of another embodiment of the film take-up spool provided in the camera according to the invention, and FIG. 8 is its cross-sectional view taken along line A—A.

Figure 9A:
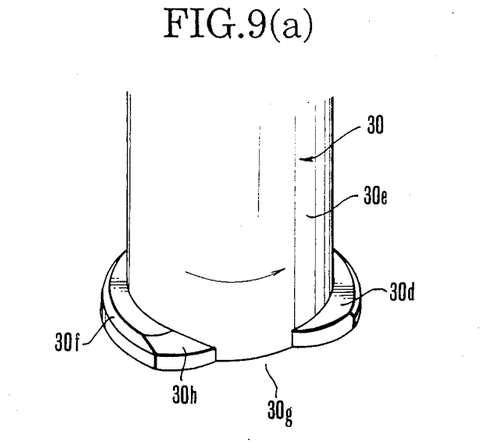
FIG. 9(a) is a perspective view in enlarged scale of its lower flange.

A film take-up spool 30 according to this embodiment has a drum portion 30e, around which film is to be wound, with which a claw 30a for engagement with the perforation of film is integrally formed near the lower end portion thereof. Disc-shaped flanges 30c and 30d for film guide are formed integrally with the drum portion 30e at the upper and lower end portions thereof. A geared portion 30b in mesh with a drive mechanism including an electric motor and others (not shown) is formed integrally with the drum portion 30e at the top thereof. The upper flange 30c and the lower flange 30d are formed to an equal outer diameter to each other. A portion of the lower flange 30d is cut off by a line almost tangent to the outer periphery of the drum portion 30e to form a cutout portion 30g, so that the lower flange 30d is formed to an almost letter "D" shape. Again, the lower flange 30d has its outer peripheral surface applied with chamfering at the upper edge as shown in FIG. 9(a) to form a chamfer 30f. Even the side of the cutout 30g is applied with a chamfer 30h.

In more detail, by making the upper and lower flanges 30c and 30d have the same diameter, the spool 30 according to this embodiment can be assembled easily with the camera body 1 likewise as in the before-described conventional example. And in this embodiment, by forming the cutout 30g in a portion of the lower flange 30d, in the case when the tip of leader of the film is put on the drum portion 30e in order to perform automatic loading, even if the corners of the tip of the leader are of K type, it happens that as the automatic loading of the film goes on, when the spool 30 rotates in a direction indicated by arrow in FIG. 9(a), the lower corner of the tip of the film leader once drops into the cutout portion 30g of the lower flange 30d, and, as the spool 30 further rotates, abuts on the side surface of the cutout of the lower flange 30d. While it tends to ride again on the outer peripheral portion of the lower flange 30d, the tip of the film leader is guided to drop on the drum portion 30e by the chamfer 30h formed in the side edge of the cutout and with the help of the elastic retrieving force of the film. Thus, the perforation of the film automatically engages the claw 30a.

It should be noted that the relative position of the cutout portion 30g to the claw 30a is, as shown in FIG. 8, taken at an angle θ of about 90° ahead the claw 30a in the advance direction as viewed from the windup direction of the spool 30. With this, it is easy that soon after the film leader has touched the drum portion 30e, the perforation of the film engages the claw 30a. Hence, the claw 30a and the perforation engage each other in good timing. This fact has been found from experiments.

The relative position of the claw 30a and the cutout portion 30g may take any other value except for the cutout portion 30g just beneath the claw 30a ($\theta \simeq \theta$). Even under this condition, the leader of the film after having once wound around the drum portion 30e does not ride again on the outer peripheral portion of the lower flange 30d, and the perforation of the film does not always fail to engage the claw 30a within one revolution of the spool 30. Accordingly, it is not limited to the above-defined angle $\theta \simeq 90°$ or thereabout.

Figure 9B:
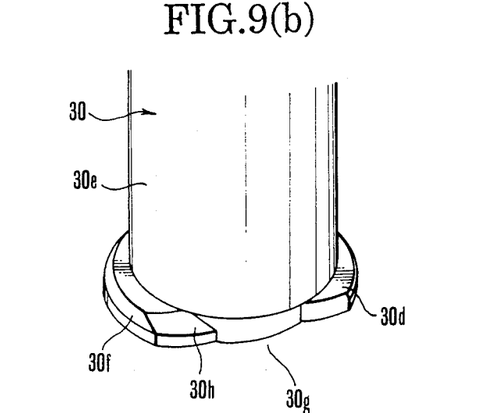
FIG. 9(b) is a perspective view of another practical example of its lower flange.

Also, though, in the above-described embodiment, the cutout portion 30g provided in the lower flange 30d is away from the outer surface of the drum portion 30e, it may be deepened into the interior of the drum portion 30e as shown in FIG. 9(b). Even in this case, a similar advantage can be obtained.

It should be noted that any of the foregoing embodiments has been described in connection with the film take-up spool of the type having the claw for engagement with the perforation of the film, it is needless to say that the present invention is applicable even to any other types of take-up spool having no such claw.

What is claimed is:

1. A film take-up spool for a camera comprising:
    (A) guide means for guiding film,
        said guide means being provided integrally with said spool; and
    (B) rationalizing means arranged upon riding of the film on said guide means to take the riding film away from the riding state as said spool rotates.

2. A spool according to claim 1, wherein said rationalizing means is provided in said guide means.

3. A spool according to claim 2, wherein said guide means includes a flange.

4. A spool according to claim 1, wherein said guide means includes a flange.

5. A spool according to claim 4, wherein said rationalizing means includes an ovoid portion of said flange.

6. A spool according to claim 4, wherein said rationalizing means includes a D-shaped cutout portion of said flange.

7. A spool according to claim 4, wherein said rationalizing means is constructed as a projected portion obtained by radially and outwardly projecting a portion of said flange.

8. A spool according to claim 7, further comprising:
    engaging means provided in said spool for engaging a perforation of the film.

9. A spool according to claim 8, wherein said engaging means is located at a position at approximately 90 degrees in the rewinding direction of the spool relative to said projected portion.

10. A spool according to claim 8, wherein said engaging means is provided near said flange.

11. A spool according to claim 7, wherein said rationalizing means is constructed as to include a chamfer portion obtained by chamfering said flange.

12. A spool according to claim 11, wherein said chamfer portion becomes smaller as it approaches said projected portion.

13. A spool according to claim 11, wherein said chamfer portion is provided on the spool rewind rotation direction side of said projected portion.

14. A spool according to claim 4, wherein said rationalizing means is constructed as a cutout portion obtained by cutting out a portion of said flange in the circumferential direction thereof.

15. A spool according to claim 14, further comprising means provided in said spool for engaging a perforation of the film.

16. A spool according to claim 15, wherein said engaging means is provided near said flange.

17. A spool according to claim 15, wherein said engaging means is located at a position at approximately 90 degrees in the rewinding direction of the spool relative to said cutout portion.

18. A spool according to claim 14, wherein said rationalizing means is constructed to include a chamfer portion obtained by chamfering said flange.

19. A spool according to claim 18, wherein said chamfer portion is provided in said cutout portion.

20. A spool according to claim 19, wherein said chamfer portion is provided in the circumference of said flange.

21. A spool according to claim 18, wherein said chamfer portion is provided in the circumference of said flange.

22. A spool according to claim 7, wherein said rationalizing means is constructed by applying a rounding treatment to said projected portion.

23. A camera having a film take-up spool, comprising:
    (A) guide means for guiding film,
        said guide means being provided integrally with said spool; and
    (B) rationalizing means arranged upon riding of the film on said guide means to take the riding film away from the riding state as said spool rotates.

24. A camera according to claim 23, wherein said rationalizing means is provided in said guide means.

25. A spool according to claim 23, wherein said guide means includes a flange.

26. A camera according to claim 23, wherein said guide means includes a flange.

27. A camera according to claim 26, wherein said rationalizing means is constructed as a projected portion obtained by radially and outwardly projecting a portion of said flange.

28. A camera according to claim 27, further comprising means provided in said spool for engaging a perforation of the film.

29. A spool according to claim 23, wherein said engaging means is located at a position at approximately 90 degrees in the rewinding direction of the spool relative to said projected portion.

30. A spool according to claim 23, wherein said rationalizing means includes an ovoid portion of said flange.

31. A spool according to claim 23, wherein said rationalizing means includes a D-shaped cutout portion of said flange.

32. A camera according to claim 28, wherein said engaging means is provided near flange.

33. A camera according to claim 27, wherein said rationalizing means is constructed to include a chamfer portion obtained by chamfering said flange.

34. A camera according to claim 33, wherein said chamfer portion becomes smaller as it approaches said projected portion.

35. A camera according to claim 33, wherein said chamfer portion is provided on the spool rewind rotation direction side of said projected portion.

36. A camera according to claim 26, wherein said rationalizing means is constructed as a cutout portion obtained by cutting out a portion of said flange in the circumferential direction thereof.

37. A camera according to claim 36, further comprising means provided in said spool for engaging a perforation of the film.

38. A spool according to claim 23, wherein said engaging means is located at a position at approximately 90 degrees in the rewinding direction of the spool relative to said cutout portion.

39. A camera according to claim 38, wherein said engaging means is provided near said flange.

40. A camera according to claim 37, wherein said rationalizing means is constructed to include a chamfer portion obtained by chamfering said flange.

41. A camera according to claim 40, wherein said chamfer portion is provided in said cutout portion.

42. A camera according to claim 41, wherein said chamfer portion is provided in the circumference of said flange.

43. A camera according to claim 40, wherein said chamfer portion is provided in the circumference of said flange.

44. A camera according to claim 31, wherein said rationalizing means is constructed by applying a rounding treatment to said projected portion.

45. A film take-up spool for a camera, comprising:
    (a) guide means for guiding a film, and
    (b) rationalizing means, in case of riding of the film on said guide means, for taking the riding film away from the riding state as said spool rotates.

46. A spool according to claim 45, wherein said rationalizing means is provided in said guide means.

47. A spool according to claim 46, wherein said guide means includes a flange.

48. A spool according to claim 46, wherein said guide means includes a flange.

49. A spool according to claim 48, wherein said rationalizing means is constructed as a projected portion obtained by radially and outwardly projecting a portion of said flange.

50. A spool according to claim 49, further comprising:
    engaging means provided in said spool for engaging a perforation of the film.

51. A spool according to claim 50, wherein said engaging means is provided near said flange.

52. A spool according to claim 50, wherein said engaging means is located at a position at approximately 90 degrees int eh rewinding direction of the spool relative to said projected portion.

53. A spool according to claim 49, wherein said rationalizing means is constructed to include a chamfer portion obtained by chamfering said flange.

54. A spool according to claim 53, wherein said chamfer portion becomes smaller as it approaches said projected portion.

55. A spool according to claim 53, wherein said chamfer portion is provided on the spool rewind rotation direction side of said projected portion.

56. A spool according to claim 49, wherein said rationalizing means is constructed by applying a rounding treatment to said projected portion.

57. A spool according to claim 48, wherein said rationalizing means is constructed as a cutout portion obtained by cutting out a portion of said flange in the circumferential direction thereof.

58. A spool according to claim 57, further comprising engaging means provided in said spool for engaging a perforation of the film.

59. A spool according to claim 58, wherein said engaging means is provided near said flange.

60. A spool according to claim 58, wherein said rationalizing means is constructed to include a chamfer portion obtained by chamfering said flange.

61. A spool according to claim 60, wherein said chamfer portion is provided in said cutout portion.

62. A spool according to claim 61, wherein said chamfer portion is provided in the circumference of said flange.

63. A spool according to claim 60, wherein said chamfer portion is provided in the circumference of said flange.

64. A spool according to claim 58, wherein said engaging means is located at a position at approximately 90 degrees in the rewinding direction of the spool relative to said projected portion.

65. A spool according to claim 48, wherein said rationalizing means includes an ovoid portion of said flange.

66. A spool according to claim 48, wherein said rationalizing means includes a D-shaped cutout portion of said flange.

67. A camera having a film take-up spool, comprising:
 (a) guide means for guiding a film, and
 (b) rationalizing means, in case of riding of the film on said guide means, for taking the riding film away from the riding state as said spool rotates.

68. A camera according to claim 67, wherein said rationalizing means is provided in said guide means.

69. A camera according to claim 68, wherein said guide means includes a flange.

70. A camera according to claim 68, wherein said guide means includes a flange.

71. A camera according to claim 70, wherein said rationalizing means is constructed as a projected portion obtained by radially and outwardly projecting a portion of said flange.

72. A camera according to claim 71, further comprising:
 engaging means provided in said spool for engaging a perforation of the film.

73. A camera according to claim 72, wherein said engaging means is provided near said flange.

74. A camera according to claim 72, wherein said engaging means is located at a position at approximately 90 degrees in the rewinding direction of the spool relative to said projected portion.

75. A camera according to claim 70, wherein said rationalizing means is constructed to include a chamfer portion obtained by chamfering said flange.

76. A camera according to claim 75, wherein said chamfer portion becomes smaller as it approaches said projected portion.

77. A camera according to claim 75, wherein said chamfer portion is provided on the spool rewind rotation direction side of said projected portion.

78. A camera according to claim 71, wherein said rationalizing means is constructed by applying a rounding treatment to said projected portion.

79. A camera according to claim 70, wherein said rationalizing means is constructed as a cutout portion obtained by cutting out a portion of said flange in the circumferential direction thereof.

80. A camera according to claim 79, further comprising engaging means provided in said spool for engaging a perforation of the film.

81. A camera according to claim 80, wherein said engaging means is provided near said flange.

82. A camera according to claim 80, wherein said rationalizing means is constructed to include a chamfer portion obtained by chamfering said flange.

83. A camera according to claim 83, wherein said chamfer portion is provided in said cutout portion.

84. A camera according to claim 83, wherein said chamfer portion is provided in the circumference of said flange.

85. A camera according to claim 82, wherein said chamfer portion is provided in the circumference of said flange.

86. A camera according to claim 80, wherein said engaging means is located at a position at approximately 90 degrees in the rewinding direction of the spool relative to said projected portion.

87. A camera according to claim 70, wherein said rationalizing means includes an ovoid portion of said flange.

88. A camera according to claim 70, wherein said rationalizing means includes a D-shaped cutout portion of said flange.

* * * * *

UNITED STATES PATENT AND TRADEMARK OFFICE
CERTIFICATE OF CORRECTION

PATENT NO. : 4,980,712            Page 1 of 3

DATED : December 25, 1990

INVENTOR(S) : MAENO

It is certified that error appears in the above-identified patent and that said Letters Patent is hereby corrected as shown below:

COLUMN 1

Line 27, "is" should be deleted.
    Line 50, "formed the gap" should read --the gap formed--.
    Line 53, "very" should read --greatly--.
    Line 57, ", and" should read --and--.
    Line 61, "drum 2e" should read --drum portion 2e--.

COLUMN 2

Line 58, "of film" should read --of the film--.

COLUMN 3

Line 20, "FIG." should read --FIG. 1--.
    Line 63, "flange 20d;" should read --flange 20d,--.

COLUMN 4

Line 15, "engagement" should read --establish engagement--.
    Line 27, "to distort" should be deleted.

COLUMN 5

Line 1, "slackened" should read --slackened,--.
    Line 37, "cuter" should read --outer--.
    Line 53, "the leader" should read --the film leader--.
    Line 68, "ahead" should read --ahead of--.

UNITED STATES PATENT AND TRADEMARK OFFICE
CERTIFICATE OF CORRECTION

PATENT NO. : 4,980,712

DATED : December 25, 1990

INVENTOR(S) : MAENO

It is certified that error appears in the above-identified patent and that said Letters Patent is hereby corrected as shown below:

COLUMN 6

Line 9,   "claw 30a (θ≃θ)." should read --claw 30a (θ≃0).--.

COLUMN 7

Line 8,   "comprising" should read --comprising:--.
    Line 9,   "means" should read --engaging means--.
    Line 41, "claim 23," should read --claim 24,--.
    Line 50, "ing means" should read --ing: ¶ engaging means--.
    Line 52, "claim 23," should read --claim 28,--.
    Line 56, "claim 23," should read --claim 26,--.
    Line 58, "claim 23," should read --claim 26,--.
    Line 62, "near flange." should read --near said flange.--.

COLUMN 8

Line 9,   "ing means" should read --ing: ¶ engaging means--.
    Line 11, "claim 23," should read --claim 37,--.
    Line 15, "claim 38," should read --claim 37,--.
    Line 17, "claim 37," should read --claim 36,--.
    Line 28, "claim 31," should read --claim 27,--.
    Line 40, "claim 46," should read --claim 45,--.
    Line 54, "int eh" should read --in the--.

UNITED STATES PATENT AND TRADEMARK OFFICE
CERTIFICATE OF CORRECTION

PATENT NO. : 4,980,712

DATED : December 25, 1990

INVENTOR(S) : MAENO

It is certified that error appears in the above-identified patent and that said Letters Patent is hereby corrected as shown below:

COLUMN 9

Line 10, "claim 58," should read --claim 57,--.
    Line 40, "claim 68," should read --claim 67,--.

COLUMN 10

Line 28, "claim 80," should read --claim 79,--.
    Line 31, "claim 83, should read --claim 82,--.

Signed and Sealed this

Eighteenth Day of August, 1992

*Attest:*

DOUGLAS B. COMER

*Attesting Officer*     *Acting Commissioner of Patents and Trademarks*